United States Patent [19]
Fulmer et al.

[11] Patent Number: 5,503,806
[45] Date of Patent: Apr. 2, 1996

[54] VARYING PERMEABILITY FILTER FOR AIRBAG INFLATOR

[75] Inventors: Brian H. Fulmer, Farr West; Todd S. Parker, Centerville, both of Utah

[73] Assignee: Morton International, Inc., Chicago, Ill.

[21] Appl. No.: 280,487

[22] Filed: Jul. 26, 1994

[51] Int. Cl.⁶ .................................................. B01J 19/14
[52] U.S. Cl. .......................... 422/164; 280/736; 280/740; 280/742; 422/165; 422/166
[58] Field of Search ..................................... 422/164, 165, 422/166, 167, 305, 218; 280/736, 740, 742

[56] References Cited

U.S. PATENT DOCUMENTS

| | | | |
|---|---|---|---|
| 2,635,989 | 4/1953 | Bonner | 422/218 |
| 3,535,879 | 10/1970 | Kuntz | 422/218 |
| 3,594,131 | 7/1971 | De Palma et al. | 422/218 |
| 4,629,483 | 12/1986 | Stanton . | |
| 5,071,457 | 12/1991 | Schmidt, Jr. et al. . | |
| 5,308,370 | 5/1994 | Kraft et al. | 280/736 |

Primary Examiner—Timothy M. McMahon
Attorney, Agent, or Firm—Philip C. Peterson; Henry W. Tarring, II; Gerald K. White

[57] ABSTRACT

A new and improved airbag inflator including a varying permeability filter. The inflator includes a housing for holding gas generating materials and has an outer diffuser wall with a plurality of discharge or diffuser ports arranged to direct the gas into an airbag for rapid inflation. The housing includes a ring of diffuser ports spaced apart around the periphery of the outer diffuser side wall and these ports are generally closer to one of the top or bottom end walls of the container than they are to the opposite end wall. A new and improved gas filter of varying permeability is mounted in the housing inside the periphery of the outer diffuser wall adjacent to the ring of ports. The annular filter has a gas permeability characteristic that varies between a maximum permeability rating in a first region farthest away from the ring of ports to a minimum permeability rating adjacent a second region closer to the ports. The varying permeability areas tend to equalize or even out the gas flow over the entire available flow cross-section of the filter so that blow-through or burn holes do not develop. Moreover, the more uniform and even flow through the entire available flow cross-section results in a maximum of filtering and entrapment of contaminants as well as excellent cooling of the hot gases with the least flow resistance overall to provide rapid inflation of the airbag during deployment.

5 Claims, 3 Drawing Sheets

5,503,806

VARYING PERMEABILITY FILTER FOR AIRBAG INFLATOR

BACKGROUND OF THE INVENTION

1. Field of the Invention

The present invention relates to a new and improved airbag inflator having a filter of varying permeability. More particularly, the present invention is concerned with a new and improved varying permeability filter for use in an airbag inflator for insuring that undesirable by-products and contaminants are filtered out and entrapped during inflation of the airbag.

2. Background of the Prior Art

One of the problems associated with airbag inflators is caused because the rapid generation of hot gases expanding and moving through a filter sometimes results in burn holes or blow out of the filter in a region closely adjacent to the diffuser outlet holes in the housing of the inflator and efficient filtering action suffers. Because the diffuser holes in many inflator housings are spaced closer to one edge of the housing than the other, the gas that is generated in the region directly opposite a ring of diffuser holes has a more direct flow path through the filter and this causes the filter to experience less gas flow through regions in the filter spaced farther away from the holes. In such cases, the filter is not able to efficiently entrap contaminants and cool the gas as well as if the flow through the filter was more uniform and even across the entire available flow cross-section of the filter media.

OBJECTS OF THE INVENTION

It is an object of the present invention to provide a new and improved airbag inflator having a varying permeability filter.

More particularly, it is an object of the present invention to provide a new and improved varying permeability filter for airbag inflators.

It is another object of the invention to provide a new and improved varying permeability filter for airbag inflators which presents a restrictive or low permeability portion in the region of a direct flow path between the gas generated and diffuser exit holes and which becomes less restrictive or more permeable in regions farther away from the direct flow path so that gas flows more uniformly and evenly throughout the entire available cross-sectional flow area of the filter.

It is another object of the present invention to provide a new and improved varying permeability filter for an airbag inflator which has a varying permeability that is greatest at a portion spaced farthest away from a ring of gas discharge ports or diffuser holes and has a minimum permeability in regions closer to the gas discharge ports.

Still another object of the present invention is to provide a new and improved varying permeability filter for an airbag inflator providing a more even or uniform gas flow through the entire available flow cross-section of the filter medium.

Yet another object of the present invention is to provide a new and improved varying permeability filter for an airbag inflator which does not suffer from burn holes blow-through in a direct flow path of the gas toward the exit diffuser holes in the housing of the inflator.

Yet another object of the present invention is to provide a new and improved airbag inflator having a housing or canister formed with a ring of gas discharge ports or diffuser holes with an annular porous filter inside the ring having varying permeability so that gas generated in the inflator during airbag deployment flows substantially uniformly or evenly throughout the entire available cross-sectional flow area of the filter to reach the exit ports and inflate the airbag.

Still another object of the present invention is to provide a new and improved varying permeability filter for airbag inflators having highly efficient operating characteristics for entrapping substantially all of the unwanted contaminants and by-products generated as the gas moves rapidly through the filter medium during airbag deployment.

BRIEF SUMMARY OF THE PRESENT INVENTION

The foregoing and other objects and advantages of the present invention are accomplished in a new and improved airbag inflator including a varying permeability filter. The inflator includes a container or housing for holding gas generating materials and has an outer diffuser wall with a plurality of discharge or diffuser ports arranged to direct the gas into an airbag for rapid inflation thereof. The container includes a ring of diffuser ports spaced apart around the periphery of the outer diffuser wall and these ports are generally closer to one side wall of the container than they are to an opposite wall thereof. A new and improved gas filter of varying permeability in accordance with the present invention is placed in the container inside the periphery of the outer diffuser wall adjacent to the ring of ports. The annular filter has a gas permeability characteristic that varies between a maximum permeability rating in a first region farthest away from the ring of ports to a minimum permeability rating adjacent a second region closer to the ports. The varying permeability areas tend to equalize or even out the gas flow over the entire available flow cross-section of the filter so that blow-through or burn holes do not develop. Moreover, the more uniform and even flow through the entire available flow cross-section results in a maximum of filtering and entrapment of contaminants and cooling of the hot gases with the least flow resistance overall to provide rapid inflation of the airbag during deployment.

BRIEF DESCRIPTION OF THE DRAWINGS

For a better understanding of the present invention, reference should be had to the following detailed description taken in conjunction with the drawings, in which.

DETAILED DESCRIPTION OF A PREFERRED EMBODIMENT OF THE INVENTION

Figure 1:
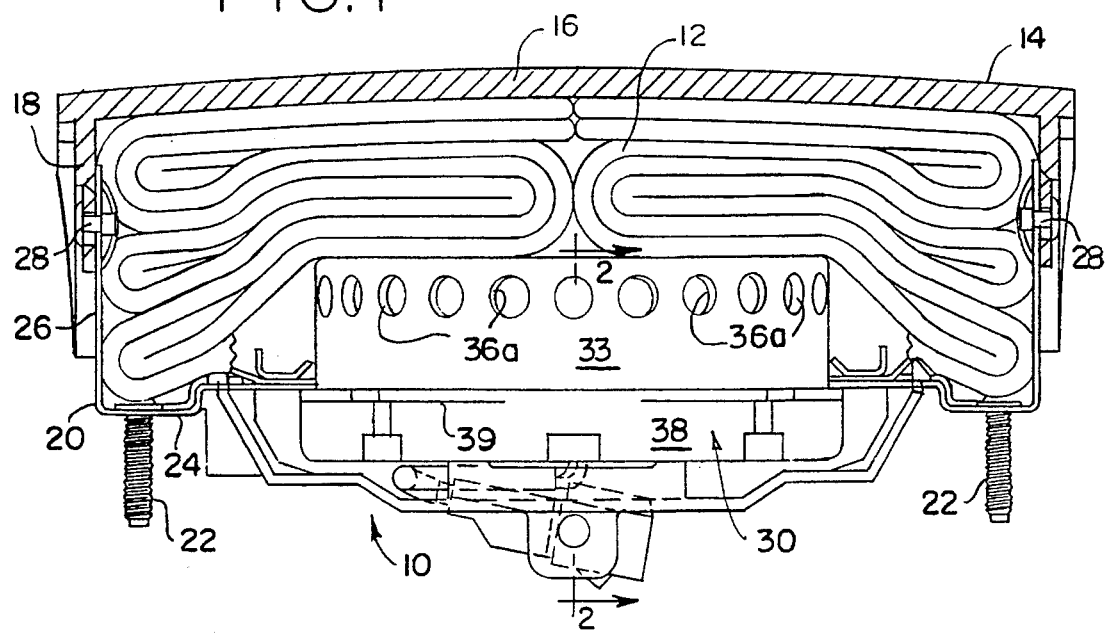
FIG. 1 is a cross-sectional view of an airbag and inflator assembly designed for mounting on a steering wheel of a motor vehicle.

Referring now to FIGS. 1–7, in FIG. 1 is illustrated an airbag and inflator assembly 10 especially adapted and designed for mounting on the steering wheel on the driver's side of a motor vehicle. The airbag inflator assembly 10 includes an airbag 12 contained in folded-up condition within a housing 14 having a frangible cover 16 adapted to fracture and/or pivot away to open when the airbag 12 is inflated during a motor vehicle accident or crash. The housing 14 has a peripheral side wall 18 depending downwardly from the frangible cover 16 and the side wall 18 is joined to an upper end portion of a peripheral lower side wall 26 of a lower half 20 of the housing 14 by means of fasteners 28. The lower half 20 of the housing 14 includes an annular bottom wall 28 adapted to be mounted on a steering wheel or hub of the vehicle by means of threaded studs 22. The bottom wall 24 of the lower half 20 of the housing 14 supports a new and improved inflator 30 (FIGS. 2 and 3) constructed in accordance with the features of the present invention.

Figure 2:
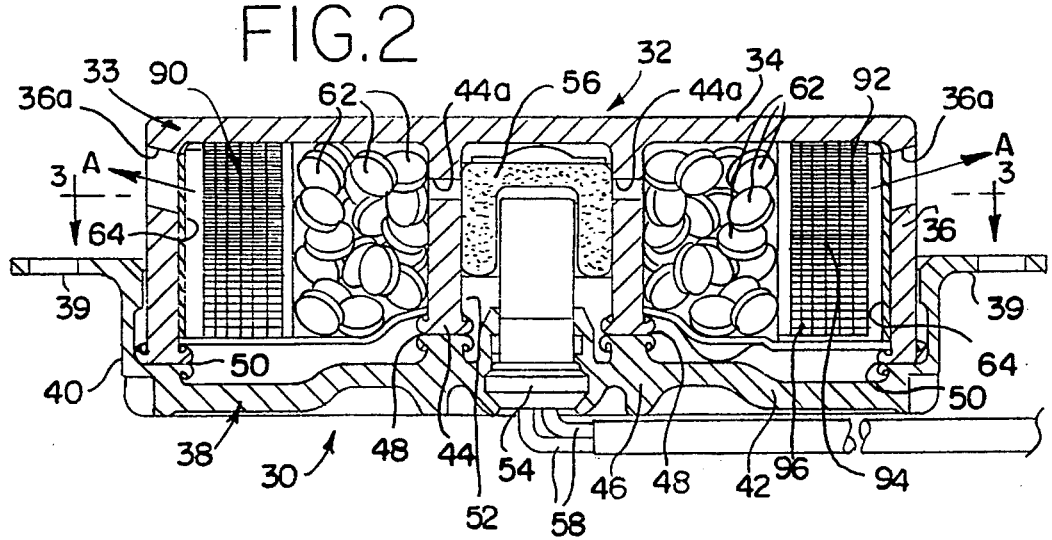
FIG. 2 is a cross-sectional view taken substantially along lines 2—2 of FIG. 1 and illustrating a new and improved varying permeability filter for an airbag inflator in accordance with the features of the present invention.
Figure 3:
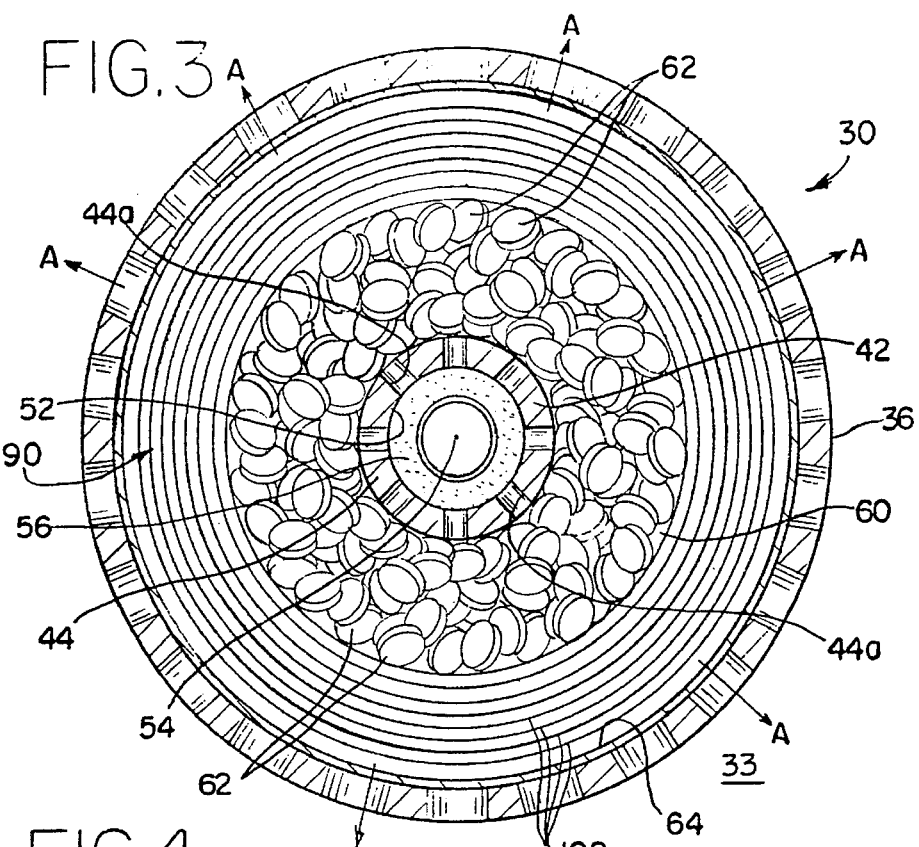
FIG. 3 is a cross-sectional view taken substantially along lines 3—3 of FIG. 2.
Figure 4:
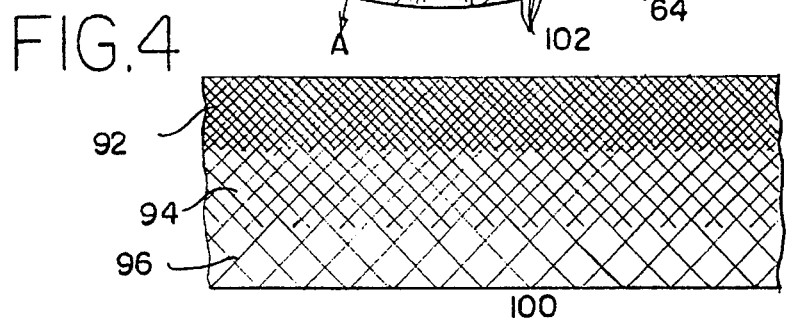
FIG. 4 is an elevational view of one embodiment of a filter medium having a varying permeability characteristic suitable for constructing a varying permeability filter in accordance with the present invention.

Referring to FIG. 2, the inflator 30 includes a metal canister or housing 32 of cylindrical shape including an upper half 33, a circular top wall 34 and a cylindrical peripheral outer side wall 36 that is preferably integrally formed therewith. The housing 32 is closed by a pan-shaped bottom half 38 having a radially outwardly directed mounting flange 39 at the upper end of a cylindrical side wall 40 and a circular bottom wall 42 is preferably integrally formed with the side wall at the lower end.

The upper half 33 is provided with an inner, concentric, cylindrically-shaped ignition chamber wall 44 preferably integrally formed with the circular top wall 34 and depending downwardly therefrom to contact a relatively short, upstanding, cylindrically-shaped ignition chamber wall 46 preferably integrally formed on the circular bottom wall 42 in concentric alignment with the outer side wall 36.

The upper half member 33 and the lower half member 38 are sealingly joined together preferably in a spin welding process to provide a hermetically sealed enclosure for the contents within the housing 32. Concentric annular spin weld areas 48 and 50 are formed at abutting faces of the inner ignition chamber walls 44 and 46 and the peripheral outer wall 36 and outer edge of the bottom wall 42.

The inner walls 44 and 46 define a centrally disposed, cylindrical ignition chamber 52 for holding an electrically ignitable squib 54 and a cup-shaped ignition enhancer charge 56 in coaxial alignment therewith. The squib 54 is ignited by an electrical signal directed into the squib through ignition wires 58 when the proper signal is received. Ignition of the squib 54 causes the enhancer 56 to ignite and the hot gaseous products of ignition that are generated flow out through a ring of spaced apart ignition wall ports 44a formed in the inner wall 44. These products flow into a main, annular gas generation chamber 60 defined between the inner ignition chamber 52 and the outer peripheral side wall 36 of the canister or housing 32.

The main gas generation chamber 60 is generally larger than the central ignition chamber 52 and contains a sizeable volume of gas generating solids 62, preferably of sodium azide or other gas generating material which is rapidly ignited or oxidized by the hot ignition gas flowing partially outwardly from the ring of spaced ignition ports 44a in the ignition chamber wall 44.

As the gas generating pellets 62 are rapidly ignited or oxidized, a large volume of hot expanding gas is generated and begins to flow radially outwardly toward the outer side wall 36. On the inside surface, the outer side wall 36 is provided with a layer of adhesively attached, metal foil 64 which normally closes off and seals a ring of circumferentially spaced apart, relatively large size diffuser ports 36a formed in the outer side wall 36. The diffuser ports or hot gas discharge ports 36a are adapted to direct the hot expanding gas radially outwardly from points around the entire periphery of the side wall 36 as indicated by the arrows A (FIGS. 2 and 3) after the foil 64 is ruptured by the increasing gas pressure being generated.

The hot gases flowing out from the diffuser ports 36a cause the airbag 12 to rapidly inflate and expand as is known in the art for protecting a vehicle driver in a crash or accident. Because the gases generated from the ignition and the gas generating pellets 60 may contain unwanted contaminants or by-products and because the temperatures developed are relatively high, it is desirable to filter out and entrap these contaminants and cool the gas before the gas enters the airbag 12.

Figure 8:
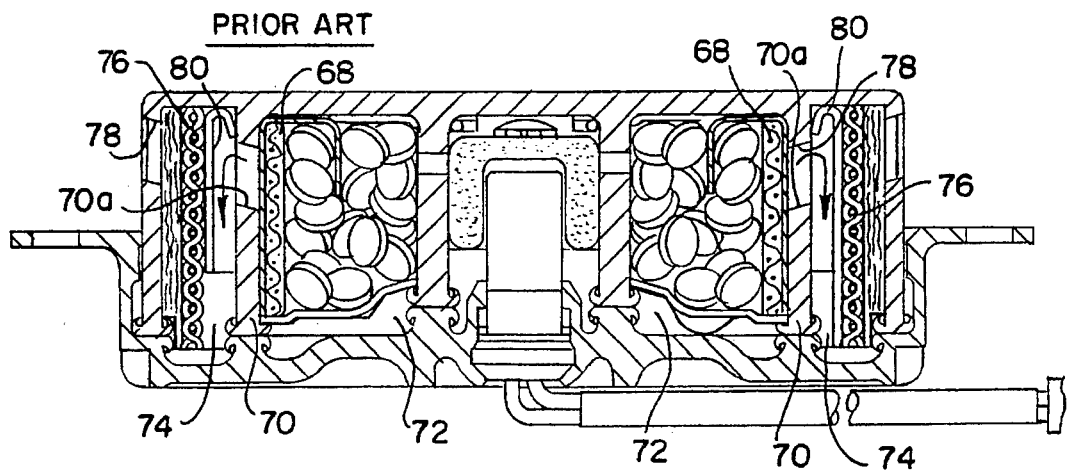
FIG. 8 is a cross-sectional view of a prior art type inflator having a conventional metal screen filter having a uniform or constant permeability.

In a typical prior art inflator such as the one shown in FIG. 8, filtering of the gas is achieved by using a wire mesh or screen filter 68 positioned against the inside surface of an intermediate wall 70 having a ring of ports 70a. The ported intermediate wall 70 supports the filter 68 and forms a separate filter chamber 74 outwardly around a main gas generation chamber 72. A second, annular screen mesh filter 76 is mounted in the filter chamber 74 just inside a ring of diffuser ports 78 adapted to radially discharge the gas generated to inflate an airbag. Moreover, sometimes a metal flow deflector 80 is mounted in the filter chamber 74 in an attempt to create a more tortuous path for the gas so that filter burn-out or direct blow-through does not occur.

In accordance with the present invention, the inflator 30 includes a new and improved, varying permeability annular filter 90 mounted in the gas generation chamber 60 inwardly of the side wall 36 and outwardly surrounding and encircling the annular body of gas generating pellets 62. The filter 90 is especially designed to filter out and entrap unwanted contaminants and by-products from the generated gas and also to provide for sufficient cooling of the gas by efficient heat absorption therefrom.

The filter 90 functions extremely efficiently and eliminates the need for multiple filters, separate deflectors and divider walls as in the prior art, while at the same time, the filter 90 is cost effective and greatly simplifies the construction and the assembly of the inflator 30.

Because there are substantially direct radial flow paths between the ignition ports 44a and the diffuser ports 36a and because these ports are normally closer to the top wall 34 than the bottom wall 38, the gas generated in the upper levels of the chamber 60 has a shorter more direct path to the ports 36a than the gas generated at intermediate and lower levels of the chamber. The filter 90 is constructed with an upper region 92 of low or minimum permeability in the direct gas flow path close to the level of the ports 36a, an intermediate region 94 of higher permeability at an intermediate level and a lower region 96 of high or maximum permeability at a lower level of the chamber 60. The varying permeability of the filter 90 results in a more uniform and even flow through the filter throughout the entire available flow cross-section as indicated graphically in FIG. 7 and also substantially eliminates the problems of burn holes and filter blow-through yet without requiring multiple separate filters, additional divider walls or separate flow deflectors.

The filter 90 is constructed of an elongated strip of filter medium such as an expanded metal strip 100 (FIG. 4) which has regions 92, 94 and 96 of low, intermediate and high porosity or permeability therein. A strip of the expanded metal 100 of suitable dimensions is wound up in successive convolutions or circular layers 102 until a desired number of layers is attained to achieve a unitary annular filter body of the desired dimensions.

Figure 5:
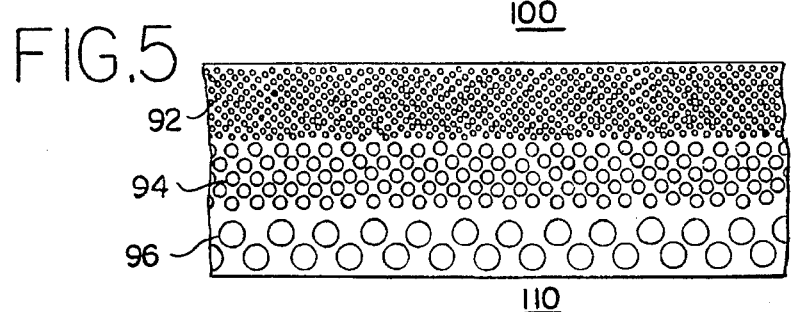
FIG. 5 is an elevational view of another embodiment of a filter medium suitable for constructing a varying permeability filter in accordance with the features of the present invention.

FIG. 5, represents another embodiment of a strip of filter medium 110 comprising a metal strip having regions 92, 94, 96 of low, intermediate and high permeability respectively, provided by punched or stamped out openings formed in the strip of small, medium and large size apertures.

Figure 6:
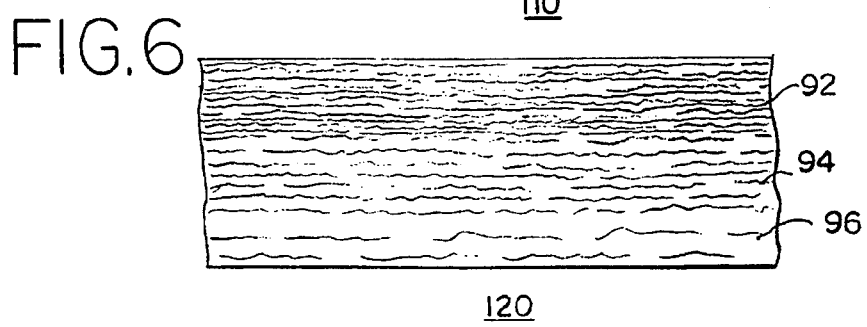
FIG. 6 is an elevational view of yet another embodiment of a filter medium suitable for constructing a varying permeability filter in accordance with the features of the present invention.
Figure 7:
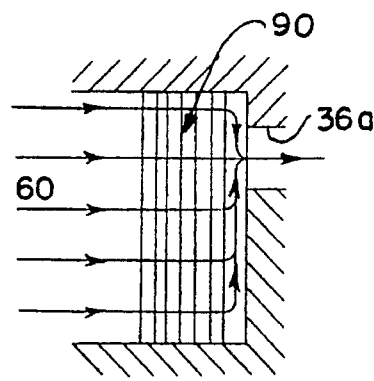
FIG. 7 is a schematic diagram graphically illustrating the improved flow characteristics of gas passing through a filter of varying permeability in accordance with the present invention.

In FIG. 6 is illustrated yet another embodiment of strip of filter medium 120 formed of stranded materials such as deposited metals and/or high temperature resistant, resinous plastic materials having strand densities of greater, intermediate and low providing the regions of low, intermediate and high permeability 92, 94, 96.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An airbag inflator, comprising:

a container holding gas generating means having an outer side wall formed with a plurality of ports for discharging gas at spaced apart positions around said wall;

said container including spaced apart opposite end walls joined to opposite edges of said outer side wall defining a filter space adjacent the interior of said outer side wall and outwardly of said gas generating means, said ports spaced closer to one of said end walls than the other; and a gas filter in said container for entrapping contaminants from the gas generated by said gas generating means having an outer edge adjacent said ports for discharging filtered and cooled gas into said ports and an inner edge adjacent said gas generating means for receiving gas therefrom, said gas filter having regions extending from said inner edge to said outer edge, said regions having different gas permeabilities that vary between a maximum at a first region farthest from said plurality of ports and a minimum at a second region closest to said ports.

2. The airbag inflator of claim 1, wherein:

the shortest direct flow path extending between said gas generating means and said ports extends across said region of minimum gas permeability.

3. The airbag inflator of claim 2, wherein:

said filter includes at least one other region having a gas permeability greater than said filter region of minimum permeability.

4. The airbag inflator of claim 3, wherein:

said filter includes yet another region of gas permeability greater than said one other region and adjacent the other of said end walls.

5. The airbag inflator of claim 2, wherein:

said filter has a plurality of levels of different gas permeability spaced from said level of said direct flow path.

\* \* \* \* \*